United States Patent
Cai et al.

(10) Patent No.: US 8,369,256 B2
(45) Date of Patent: *Feb. 5, 2013

(54) INACTIVITY TIMER IN A DISCONTINUOUS RECEPTION CONFIGURED SYSTEM

(75) Inventors: Zhijun Cai, Euless, TX (US); James Earl Womack, Bedford, TX (US)

(73) Assignee: Research In Motion Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/399,811

(22) Filed: Feb. 17, 2012

(65) Prior Publication Data

US 2012/0147803 A1  Jun. 14, 2012

Related U.S. Application Data

(63) Continuation of application No. 12/193,918, filed on Aug. 19, 2008, now Pat. No. 8,144,679.

(60) Provisional application No. 60/974,653, filed on Sep. 24, 2007, provisional application No. 60/956,845, filed on Aug. 20, 2007.

(51) Int. Cl.
*H04W 52/02* (2009.01)
(52) U.S. Cl. ............ 370/311; 370/310; 370/236
(58) Field of Classification Search ........... 370/310–311
See application file for complete search history.

(56) References Cited

U.S. PATENT DOCUMENTS

| | | | |
|---|---|---|---|
| 6,973,052 B2 | 12/2005 | Wang et al. | |
| 6,975,629 B2 | 12/2005 | Welin | |
| 7,027,400 B2 | 4/2006 | O'Neill | |
| 7,221,945 B2 | 5/2007 | Milford et al. | |
| 7,372,818 B2 | 5/2008 | Fraser et al. | |
| 7,596,366 B2 | 9/2009 | Van Bosch et al. | |
| 7,899,003 B2 | 3/2011 | Xu | |
| 7,995,661 B2 | 8/2011 | Xu | |
| 2003/0157887 A1 | 8/2003 | Willenegger | |
| 2003/0185162 A1 | 10/2003 | Fraser et al. | |
| 2004/0042492 A1 | 3/2004 | Suzuki et al. | |
| 2004/0093174 A1 | 5/2004 | Lander | |
| 2004/0185918 A1 | 9/2004 | Fan et al. | |
| 2004/0264433 A1 | 12/2004 | Melpignano | |
| 2005/0009578 A1 | 1/2005 | Liu | |
| 2005/0047387 A1 | 3/2005 | Frederiksen et al. | |
| 2005/0063330 A1 | 3/2005 | Lee et al. | |
| 2005/0128998 A1 | 6/2005 | Jelitto et al. | |
| 2005/0135302 A1 | 6/2005 | Wang et al. | |
| 2005/0201353 A1 | 9/2005 | Lee et al. | |
| 2005/0254444 A1 | 11/2005 | Meier et al. | |
| 2005/0254459 A1 | 11/2005 | Qian | |

(Continued)

FOREIGN PATENT DOCUMENTS

| | | |
|---|---|---|
| CA | 2344911 | 12/2001 |
| EP | 0529269 | 3/1993 |

(Continued)

OTHER PUBLICATIONS

LG Elecetronics "DRX Scheme" Nov. 6, 2006, pp. 3.*

(Continued)

*Primary Examiner* — Sulaiman Nooristany
(74) *Attorney, Agent, or Firm* — Finnegan, Henderson, Farabow, Garrett & Dunner, LLP

(57) ABSTRACT

Systems, methods and wireless devices are provided that utilize a timer to ensure a receiver of a wireless device is on to receive downlink transmissions. In the event the timer runs out without further resource allocation, the mobile device turns its radio off. If a further resource allocation occurs while the timer is running, the timer is restarted.

4 Claims, 10 Drawing Sheets

U.S. PATENT DOCUMENTS

| | | | |
|---|---|---|---|
| 2005/0281222 | A1 | 12/2005 | Ranta-Aho et al. |
| 2006/0019641 | A1 | 1/2006 | Vayanos et al. |
| 2006/0252449 | A1 | 11/2006 | Ramesh |
| 2007/0004374 | A1 | 1/2007 | Kneckt |
| 2007/0060167 | A1 | 3/2007 | Damnjanovic et al. |
| 2007/0061433 | A1 | 3/2007 | Reynolds et al. |
| 2007/0082620 | A1 | 4/2007 | Zhang et al. |
| 2007/0087724 | A1 | 4/2007 | Jang et al. |
| 2007/0177630 | A1 | 8/2007 | Ranta et al. |
| 2007/0286080 | A1* | 12/2007 | Kim et al. ............... 370/236 |
| 2007/0291673 | A1 | 12/2007 | Demirhan et al. |
| 2008/0090583 | A1 | 4/2008 | Wang et al. |
| 2008/0101268 | A1* | 5/2008 | Sammour et al. .......... 370/311 |
| 2008/0117891 | A1 | 5/2008 | Damnjanovic et al. |
| 2008/0167089 | A1 | 7/2008 | Suzuki et al. |
| 2008/0181127 | A1 | 7/2008 | Terry et al. |
| 2008/0186944 | A1 | 8/2008 | Suzuki et al. |
| 2008/0192703 | A1 | 8/2008 | Suzuki |
| 2008/0207229 | A1 | 8/2008 | Cave et al. |
| 2008/0232284 | A1* | 9/2008 | Dalsgaard et al. .......... 370/310 |
| 2008/0232310 | A1 | 9/2008 | Xu |
| 2008/0267105 | A1 | 10/2008 | Wang et al. |
| 2008/0310333 | A1 | 12/2008 | Balachandran et al. |
| 2008/0311919 | A1 | 12/2008 | Whinnett et al. |
| 2009/0046627 | A1 | 2/2009 | Xu |
| 2009/0074090 | A1 | 3/2009 | Xu et al. |
| 2009/0180414 | A1 | 7/2009 | Maeda et al. |
| 2009/0186614 | A1 | 7/2009 | Aoyama et al. |
| 2009/0274107 | A1 | 11/2009 | Park et al. |
| 2010/0142485 | A1 | 6/2010 | Lee et al. |
| 2010/0184443 | A1 | 7/2010 | Xu |
| 2010/0309798 | A1 | 12/2010 | Fodor et al. |

FOREIGN PATENT DOCUMENTS

| | | |
|---|---|---|
| EP | 0924890 | 6/1999 |
| EP | 1289181 | 3/2003 |
| EP | 1317156 | 6/2003 |
| EP | 1450240 | 8/2004 |
| EP | 1492263 | 12/2004 |
| KR | 10-2001-0080057 | 8/2001 |
| KR | 10-2002-0002305 | 1/2002 |
| KR | 10-2004-0050422 | 6/2004 |
| WO | 00/21236 | 4/2000 |
| WO | 02/33875 | 4/2002 |
| WO | 03/096707 | 11/2003 |
| WO | 2004/004194 | 1/2004 |
| WO | 2005/022772 | 3/2005 |
| WO | 2006/002379 | 1/2006 |
| WO | 2006/046754 | 5/2006 |
| WO | 2006/103498 | 10/2006 |
| WO | 2006/114710 | 11/2006 |
| WO | 2007/014021 | 2/2007 |
| WO | 2007/025138 | 3/2007 |
| WO | 2007073118 | 6/2007 |
| WO | 2007/089797 | 8/2007 |

OTHER PUBLICATIONS

Alcatel-Lucent, "DL Control Signaling and Multiplexing vor VoIP," 3GPP TSG RAN WG1 Meeting #48bis, R1-071721, Mar. 26-30, 2007, pp. 1-4, XP002460800, St. Julians, Malta.

Dottling et al., "Efficient Channel Quality Feedback Schemes for Adaptive Modulation and Coding of Packet Data," Vehicular Technology Conference, 2004, VTC2004-Fall, 2004 IEEE 60th, vol. 2, pp. 1243-1247, Sep. 26-29, 2004.

Ericsson et al., "Maximum number of hybrid AQR processes," TSG-RAN WG1 #50, R1-073871, Aug. 20-24, 2007.

Ericsson et al., "Maximum Number of Hybrid ARQ Processes," TSG-RAN WG1 #50, R1-073871, May 7-11, 2007.

Ericsson, "DRX Control for LTE Active and VoIP," 3GPP TSG-RAN WG2 Meeting #58, R2-071818, May 7-11, 2007, Kobe, Japan.

Ericsson, "Performance Gains of the Semi-Autonomous DRX Scheme for LTE," 3GPP TSG-RAN WG2 Meeting #58-bis, Jun. 2007.

Ericsson, Semi Persistent Scheduling, TSG-RAN WG2 Meeting #55, Oct. 2006.

Ericsson: "DRX and VoIP" 3rd Generation Partnership Project (3GPP), [Online] Aug. 15, 2007, XP050135937 (corresponding European Search Report dated Jun. 5, 2009) Retrieved from the Internet: URL: ftp://ftp.3gpp.org/tsg_ran/WSG-RL2/TSG_R2_59/Docs/R2-073208.zip>.

European Communication dated Jun. 15, 2009 issued in European Patent Application No. 08162639.2.

European Communication dated Nov. 5, 2009 issued in European Patent Application No. 08162639.2.

European Communication regarding EP Application No. 11 160 318.9 dated Nov. 15, 2011 (4 pages).

European Decision to Refuse Application dated Feb. 17, 2011 issued in European Patent Application No. 08162639.2.

European Examination Report Dated Feb. 9, 2010 for European Patent Application No. 08162615.2.

European Search Report dated Dec. 16, 2008 based on EP 08 16 2615.

European Search Report dated Dec. 16, 2008 based on EP 08 16 2639.

European Search Report dated Dec. 20, 2007 based on EP 07 10 8885.

European Search Report dated Nov. 25, 2008 based on EP 08 162 638.

European Search Report dated Sep. 12, 2007 based on EP 07 10 7587.

European Search Report for EP Application No. 11160318.9 dated Jun. 24, 2011.

European Summons to Oral Proceedings dated May 10, 2010 issued in European Patent Application No. 08162639.2.

Extended European Search Report for EP Application No. 11160318.9 dated Jun. 24, 2011 (5 pages).

Extended European Search Report for EP Application No. 11179329.5 dated Dec. 21, 2011 (9 pages).

Fukui, N., "Study of Channel Quality Feedback in UMTS HSDPA," Personal, Indoor and Mobile Radio Communications, 2003, PIMRC 2003, 14th IEEE Proceedings on vol. 1., pp. 336-340, Sep. 7-10, 2003.

Jiang, Dajie et al., "Principle and Performance of Semi-Persistent Scheduling for VoIP in LTE Stem," International Conference on Wireless Communications, Networking and Mobile Computing, 2007 (WiCom 2007), Sep. 21-25, 2007, pp. 2861-2864.

LG Electronics Inc., "Uplink Scheduling for VoIP," 3GPP TSG RAN WG2 #56, R2-063273, Nov. 6-10, 2006, pp. 1-3, XP002460797, Riga, Latvia.

LG Electronics, "DRX Scheme," 3GPP TSG-RAN WG2 #56 R2-063248, Riga, Latvia, Nov. 6-10, 2006 (3 pages).

Lucent Technologies, "Uplink Scheduling Requests for Real Time Services," 3GPP TSG-RAN2, #54, R2-062227, Aug. 28-Sep. 1, 2006, pp. 1-5, XP002460798.

Nokia Siemens Networks, "Update on Security System Information, Mobility, MBMS, and DRX," 3GPP TSG-RAN2 Meeting #59, R2-073855, Jun. 20-24, 2007, Athens, Greece.

Nokia, Nokia Siemens Networks: "Further considerations on DL semi-persistent scheduling" 3GPP TSG-RAN WG2 Meeting #58, R2-071743, May 7, 2007, pp. 1-3, XP002503687.

NTT Docomo, Inc., "Comparison of Persistent Resource Alocation Schemes in LTE Uplink," 3GPP TSG RAN WG2 #56, R2-060283, Jan. 16-19, 2007, pp. 1-5, XP002460799, Riga Litvia.

NTT Docomo, Inc., "Uplink Resource Allocation Scheme," 3GPP TSG RAN WG2 #54, R2-062164, Aug. 28-Sep. 1, 2006, pp. 1-5, XP002460801, Tallinn, Estonia.

Office Action for U.S. Appl. No. 12/193,991, dated Mar. 16, 2011 (19 pages).

PCT Search eport dated Mar. 13, 2008 based on PCT/CA2007/002311.

PCT Search Report dated Apr. 17, 2008 based on PCT/CA2007/002368.

PCT Search Report dated Apr. 17, 2008 based on PCT/CA2008/000003.

PCT Search Report dated Apr. 24, 2008 based on PCT/CA2008/000001.

PCT Search Report dated Aug. 1, 2008 based on PCT/CA2008/000771.

PCT Search Report dated Aug. 8, 2008 based on PCT/CA2008/000770.
PCT Search Report dated Dec. 26, 2008 based on PCT/US2008/073580.
PCT Search Report dated Feb. 28, 2009 based on PCT/US2008/073593.
PCT Search Report dated Feb. 6, 2009 based on PCT/US2008/073585.
PCT Search Report dated Mar. 13, 2008 based on PCT/CA2007/002311.
PCT Search Report dated May 21, 2008 based on PCT/CA2007/002299.
Research in Motion Limited: "Semi-persistent Scheduling and DRX Control, " 3GPP DRAFT: R2-073245, 3rd Generation Partnership Project (3GPP), Mobile Competence Centre; 650, Route Des Lucioles; F-06921 Sophia-Antipolis Cedex; France, vol. Tsg_ran.
Samsung, "VoIP Support in LTE," 3GPP TSG RAN WG1 Meeting #48, R1-070961, Feb. 12-16, 2007, pp. 1-6, XP002460796, St. Louis, Missouri.
Shun-Ren Yang et al., "Modeling UMTS Discontinuous Reception Mechanism," IEEE Transactions on Wireless Communications, Jan. 2006, vol. 4, No. 1, pp. 312-319.
Soo-Yong Jeon et al., "Channel Adaptive CQI Reporting Schemes for UMTS High-Speed Downlink Packet Access," Vehicular Technology Conference, 2006, VTC2006-Fall, 2006 IEEE 64th, p. 1-5, Sep. 25-28, 2006.
U.S. Office Action dated Jan. 31, 2011 based on U.S. Appl. No. 11/957,624.
U.S. Office Action dated Mar. 1, 2011 based on U.S. Appl. No. 11/969,082.
U.S. Office Action dated Mar. 2, 2011 based on U.S. Appl. No. 11/968,518.

* cited by examiner

INACTIVITY TIMER IN A DISCONTINUOUS RECEPTION CONFIGURED SYSTEM

RELATED APPLICATIONS

This is a continuation of application Ser. No. 12/193,918, filed Aug. 19, 2008 which claims the benefit of U.S. provisional application Nos. 60/974,653, filed Sep. 24, 2007 and 60/956,845, filed Aug. 20, 2007, all of which are incorporated herein by reference.

FIELD OF THE APPLICATION

The application relates to wireless communication, and more particularly to transmission scheduling for wireless communication.

BACKGROUND

With semi-persistent scheduling, for downlink VoIP (voice over IP (Internet Protocol)) communications to a mobile device, a periodic DL (downlink) transmission resource is allocated during a talk-spurt on the downlink. The same resource is allocated each time. The allocation is turned on during each of the talk-spurts and off between talk-spurts. In this manner, explicit signalling to request an allocation, and to grant a particular VoIP allocation is not required. Semi-persistent scheduling for uplink VoIP communications from a mobile station is similar.

In addition to regular VoIP traffic, mobile devices also need the ability to send and transmit larger IP packets. Such larger IP packets are likely to be relatively infrequent compared to the frequency of regular VoIP transmissions. Such packets might include uncompressed IP packets, RTCP (Remote Transmit Power Control) packets, SIP/SDP (Session Initiation Protocol/Session Description Protocol) packets, etc. Such IP packets may be several hundreds of bytes in size and may have high priority. In addition, larger packets may be required to transmit RRC (Radio Resource Control) Signalling messages. Examples of this are handover related messages such as measurement reports. Some mobile devices will also need the ability to deliver a mixed service in which case services in addition to VoIP need to be provided to the mobile device, such as e-mail, web browsing etc.

BRIEF DESCRIPTION OF THE DRAWINGS

Embodiments will now be described with reference to the attached drawings in which.

DETAILED DESCRIPTION OF EMBODIMENTS

Figure 1:
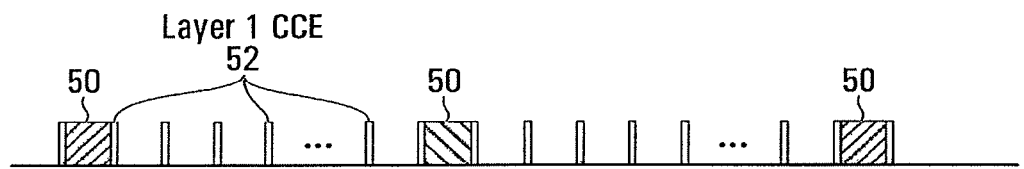
FIG. 1 is a signalling diagram showing dynamic scheduling vs. semi-persistent scheduling.

According to one broad aspect, the application provides a method in a wireless device, the method comprising: configuring the device for discontinuous reception (DRX) having on durations; receiving signalling over a control channel, during one of the on durations; and starting an inactivity timer.

According to another broad aspect, the application provides a wireless device comprising: a processor configured to control a receiver to have on durations; a receiver configured to receive signalling over a control channel during one of the on durations; and the processor further configured to start an inactivity timer upon reception of the signalling over the control channel.

According to another broad aspect, the application provides a method of controlling a radio in a wireless device, the method comprising: controlling the radio during a plurality of awake periods and a plurality of sleep periods, the awake periods alternating in time with the sleep periods, such that the radio is always on during each of the awake periods, and the radio is off for at least some of the sleep periods; receiving, during one of the awake periods, signaling that defines a downlink transmission resource to communicate a packet or sub-packet, the transmission resource allocated during a portion of a sleep period; controlling the radio to be on during the portion of the sleep period; and monitoring, during the portion of the sleep period, for signaling that defines an additional transmission resource to communicate an additional downlink packet or sub-packet, and in the event such signaling is received, controlling the radio to be on for an additional portion of a sleep period.

According to another broad aspect, the application provides a wireless device comprising: a wireless access radio for sending and receiving wireless communications to and from a network; a radio manager that controls the radio of the wireless device during a plurality of awake periods and a plurality of sleep periods, the awake periods alternating in time with the sleep periods, such that the radio is always on during each of the awake periods, and the radio is off for at least some of the sleep periods; the wireless device further configured to: receive, during one of the awake periods, signaling that defines a downlink transmission resource to transmit an additional downlink packet or sub-packet, the downlink transmission resource allocated during a portion of a sleep period; control the radio to be on during the portion of the sleep period; and monitor, during the portion of the sleep period, for signalling that defines additional downlink transmission resource to transmit another additional downlink packet or sub-packet, and in the event such signalling is received, controlling the radio to be on for an additional portion of a sleep period.

Further aspects provide wireless networks, base stations, wireless devices that execute one or more of the methods summarized above or detailed herein. Another embodiment provides a computer readable medium having computer readable instructions for controlling the execution of one or more of the methods summarized above or detailed herein.

Dynamic scheduling has been proposed to allow the dynamic allocation of transmission resources, and the subsequent transmission of a large packet using the dynamically allocated resources. Dynamic scheduling involves allocating a resource each time a packet is to be transmitted, and the resource can differ for each allocation. In a particular example, see Applicant's co-pending U.S. Provisional Patent Application No. 60/944,376 filed on Jun. 15, 2007 and hereby incorporated by reference in its entirety.

In a specific example, a mobile device supporting VoIP with dynamic scheduling monitors layer 1 CCEs (Control Channel Elements) continuously for dynamic scheduling grants even though the mobile device might be only involved in a VoIP session. LTE (Long Term Evolution) refers to CCEs, but the term has more general application to mean simply control information.

As indicated above, a mobile device may support VoIP with dynamic scheduling by monitoring layer 1 CCEs continuously for dynamic scheduling grants. Unfortunately, this might waste battery power for the mobile device, particularly when there are very few or even no dynamic scheduling grants for the mobile device.

Referring now to FIG. 1, shown is a signalling diagram showing dynamic scheduling vs. semi-persistent scheduling. Time is on the horizontal axis. Shown is a periodic semi-persistent allocation 50. For VoIP transmission, this can for example include a resource allocated every 20 ms. In addition, there is a regular set of layer 1 CCEs 52 that are transmitted. In the illustrated example, these are transmitted in every 1 ms but it is to be clearly understood that the other resource allocation periods and CCE periods are possible. This example assumes downlink transmission, but a similar approach applies to uplink transmission. During the periods that occur between talk-spurts, (also referred to as "silence" or "silence periods"), the transmitter and receiver can be turned off. During a talk-spurt period (also referred to as a period that VoIP transmission is "active", or "active mode"), if not for dynamic scheduling, the mobile device could wake up regularly to blind-detect its data in the semi-persistently allocated resource at the pre-defined interval (e.g. every 20 ms) while entering a "sleeping" mode at other times. This can also be referred to as DRX (discontinuous reception). This simply means that the receive capability of the mobile device's radio is basically turned off while the mobile device is in sleep mode thereby resulting in battery life extension. However, given that other data may arrive via dynamic scheduling by any of the CCEs 52, the mobile device needs to monitor the CCEs of all sub-frames. In the full dynamic scheduling case there is no DTX or DRX ruling out the possibility of using DRX since the mobile device needs to continue monitoring the layer 1 CCEs for dynamic scheduling grants for possible data coming. This is not power efficient and leads to lower battery charge lifetimes.

To efficiently support the DRX in VoIP active mode in order to reduce the battery power consumption, systems and methods are provided for combining semi-persistent scheduling for VoIP with a scheduling capability for additional packet transmission. These methods are particularly effective for a mobile device that is only involved in a VoIP session (i.e. not requiring mixed service).

System for Semi-Persistent Scheduling and DRX Control

Figure 2:
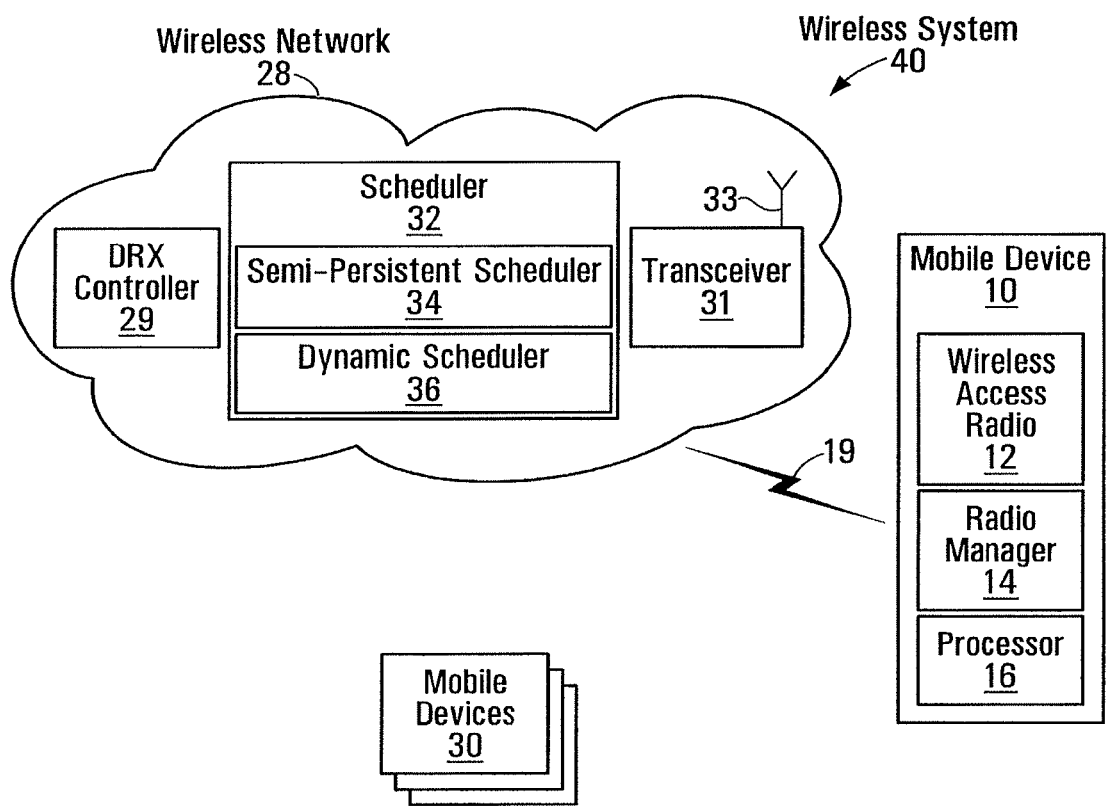
FIG. 2 is a block diagram of an example wireless system.

Referring now to FIG. 2, shown is a block diagram of an example wireless system 40. The wireless system 40 has a wireless network 28 and a mobile device 10. The wireless system also has other mobile devices 30.

The mobile device 10 has a wireless access radio 12, a processor 16 and a radio manager 14 that is responsible for controlling the wireless access radio 12. There may be additional components not shown. The wireless network 28 has a scheduler 32 that encompasses a semi-persistent scheduler 34 and a dynamic scheduler 36. The scheduler 32 may reside in a base station or elsewhere in the network 28. In LTE, the scheduler is typically in the eNB (enhanced NodeB). In the examples that follow, it is assumed that scheduler 32, transceiver 31 and antenna 33 are all parts of a base station. Also shown is a DRX controller 29 that is responsible for setting up/configuring/obtaining knowledge of the DRX behaviour for each mobile device. The DRX controller 29 may be part of a base station and may be implemented in software running on appropriate hardware, hardware, firmware or combinations thereof.

The wireless network 28 has components such as base stations (not shown) for providing wireless access. The scheduler 32 may reside in the base stations or elsewhere in the network 28. In LTE, the scheduler is typically in the eNB (enhanced NodeB). In the examples that follow, it is assumed scheduler 32 is part of a base station.

In the illustrated example, the scheduler 32 and radio manager 14 are implemented as software and executed on processors forming part of the network 28 and mobile device 10 respectively. However, more generally, these functions may be implemented as software, hardware, firmware, or any appropriate combination thereof.

Furthermore, it is to be understood that the wireless network would have any appropriate components suitable for a wireless network 28. Note that the wireless network may include wires that interconnect network components in addition to components for providing wireless communication with mobile devices. The components of the wireless network are implementation specific and may depend on the type of wireless network. There are many possibilities for the wireless network. The wireless network might for example be a UMTS network or any cellular network that uses semi-persistent resource assignment.

In operation, the mobile device 10 communicates with the wireless network 28 over a wireless connection 19 between the mobile device 10 and the wireless network 28. The communication with the wireless network 28 includes VoIP packet transmission and additional packet transmission. The semi-persistent scheduler 34 is responsible for making an initial resource allocation for a VoIP service to the mobile device 10. This includes an uplink semi-persistent allocation and a downlink semi-persistent allocation. The semi-persistent scheduler 34 is also responsible for keeping track of whether there is a talk-spurt in progress for the uplink and/or the downlink and for turning on and off the uplink and/or downlink allocation accordingly. While de-allocated, the semi-persistently allocated resources can be made available for other purposes. Note that the form of the transmission resources that are being allocated is implementation specific. Particular examples of resources that might be used include OFDM resources and CDMA resources. The dynamic scheduler 36 is responsible for making resource allocations for additional packet transmissions that are not accommodated by the semi-persistent allocation. The additional packets may be related to and/or form part of the VoIP service, or be unrelated to the VoIP service.

The radio manager 14 controls the on/off state of the wireless access radio 12. In some wireless access radios, the transmitter and receiver must be turned on and off together, and as such, uplink and downlink scheduling must be coordinated to allow the wireless access radio to be turned off. In some wireless access radios, receive and transmit capabilities can be independently turned off.

In some embodiments, the network 28 sends DRX control signalling to the mobile device 10 that sets a repeating pattern that has a DRX period having an awake period and a sleep period. An example could be: DRX period is 20 ms with sleep period equal to 15 ms and awake period equal to 5 ms. During the awake period, the mobile device turns its receiver on.

During the sleep period, the mobile device turns its receiver off. This signalling might be sent at the start of each VoIP session, for example.

In some embodiments, in addition to the above-discussed DRX control functions, the DRX controller 29 performs radio resource control and radio resource management, which take care of one or more of radio resource assignment/release/re-assignment, radio bearer control, admission control, radio related signalling, mobility, measurement, and paging, to name a few specific examples.

Figure 3:
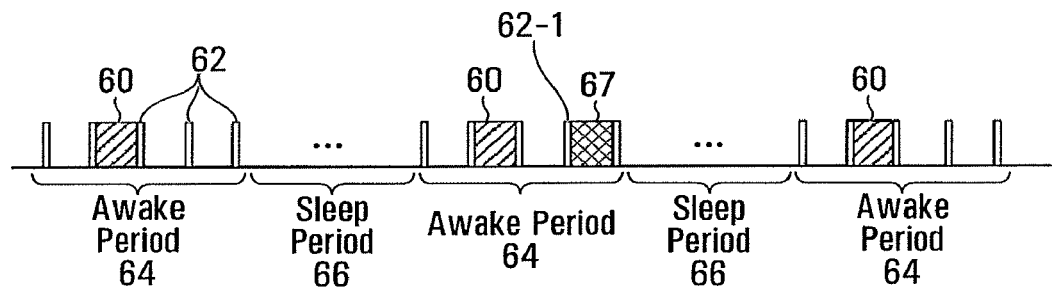
FIG. 3 is a signalling diagram showing an awake period for dynamic scheduling in DRX (discontinuous reception)

Referring now to FIG. 3, shown is a signalling diagram showing an example of semi-persistent and dynamic scheduling and DRX. Shown is a semi-persistent allocation 60 available for semi-persistent VoIP downlink transmissions. In addition, there are layer 1 CCEs 62 for signalling dynamic allocations so as to allow the transmission of additional packets. This represents the transmissions from the base station. The mobile device receiving the transmissions alternates between being in an awake state and a sleep state. The mobile station is in an awake state during awake periods 64 and the mobile device is nominally in a sleep state during sleep periods 66. The first thing that the scheduler in the network needs to do is to ensure that the semi-persistent allocation 60 coincides with the awake periods 64. In addition, each awake period 64 is longer than the minimum necessary to transmit the VoIP semi-persistent allocation. There is also the opportunity to dynamically schedule (as signalled on one of the CCEs 62) and transmit an additional packet. An example of this is shown where a dynamic allocation is signalled in CCE 62-1. Additional packet 67 is shown transmitted immediately following CCE 62-1. The additional packet might for example be an RTCP packet, SIP/SDP packet, or a packet that has not undergone IP\UDP\RTP header compression, etc. While the mobile device is in the sleep state, it operates in a reduced power consumption mode, by turning off reception capability and/or by turning off its reception and transmission capabilities. In this example, the network has scheduled the additional packet 67 to be transmitted during one of the awake periods 64, and signals this using a CCE 62-1 that is transmitted during one of the awake periods 64. More generally, when the mobile device wakes up after a sleep period, the mobile device will not only blind detect its own VoIP data on the semi-persistently allocated resource 60, but also will detect, more generally attempt to detect, all the CCEs during the awake periods.

In some embodiments, after the mobile device determines that there will be a dynamically allocated resource for the mobile device as signalled in one of the CCEs in a given awake period, the mobile device does not monitor further CCEs during that awake period.

In some embodiments, the base station will transmit signalling to configure the mobile device with this DRX behaviour, and thereafter all the dynamic scheduling will occur only in this "awake period". For example, the mobile device may sleep every 15 ms, and then wake up for 5 ms to continuously receive data. The behaviour repeats with a period of 20 ms. During the 5 ms awake period, the mobile device will blind-detect its VoIP data on the semi-persistently allocated resource and also the mobile device will monitor all the CCEs. The base station understands this DRX configuration and will schedule the associated dynamic packets such as RTCP, SIP/SDP, etc, during this 5 ms awake period. In some implementations, when a retransmission occurs, the mobile device will be in continuous mode by default.

The radio manager 14 controls the operation of the wireless access radio 12 such that a reception capability is powered on during the awake periods, and off for at least some of the sleep periods. As described below, it may be necessary for the reception capability to be on during some of the sleep periods to allow for retransmissions.

The signalling for dynamic scheduling is performed during the awake periods. In addition, the actual resources allocated for the additional packet transmissions are scheduled to occur during the awake periods.

In some embodiments, when it becomes necessary for a retransmission, the mobile device enters a continuous mode of operation. While in continuous mode, the mobile device continuously receives and monitors the downlink channel and does not turn off reception capability. Further, in some embodiments, if a mixed service needs to be provided to the mobile device, this is used as a trigger to also enable the continuous mode operation. This trigger may be dependent on the traffic QoS of the service being added.

Uplink Semi-Persistent Alignment with Downlink for DRX

Figure 4:
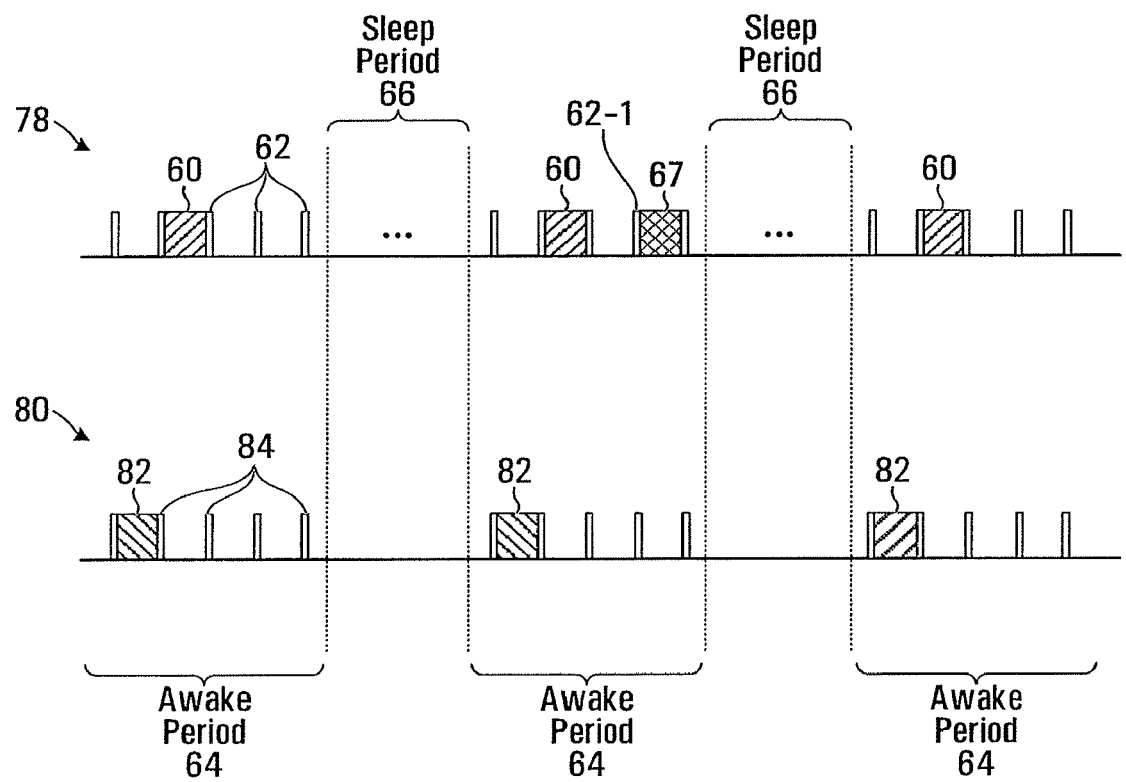
FIG. 4 is a signalling diagram showing DRX and DTX (discontinuous transmission) for uplink and downlink.

The above discussion is focussed on downlink transmission from the base station to the mobile device and on the mobile device's ability to turn off its reception capability during the sleep period. However, some mobile devices are not able to turn off only their reception capability while leaving on a transmit capability or vice versa. Thus, for such devices in order to fully realize the benefit of having an awake period and a sleep period for reception, uplink transmissions should also be scheduled to align with these awake periods and sleep periods. An example of this is shown in FIG. 4. In FIG. 4, the downlink transmission is indicated at 78 and this is basically the same as that described above with reference to FIG. 3, and this will not be described again. The uplink transmissions are generally indicated at 80. Here, there is a semi-persistent allocation 82 for VoIP UL transmissions. These are scheduled to occur during the periods 64 that the mobile device is awake. In addition, an uplink control channel is indicated at 84. In the illustrated example, this occurs every 1 ms. The mobile device only transmits the uplink control channel during the awake periods 64. The mobile device can use the uplink control channel to make requests for additional resources. By scheduling the uplink semi-persistent transmission and downlink semi-persistent transmission to occur during the same awake period, the mobile device can realize much more efficient DRX and DTX (discontinuous reception and discontinuous transmission) behaviour. In the example of FIG. 4, the mobile device is configured to sleep every 15 ms, and then wake up for 5 ms. During this 5 ms awake period, the mobile device will receive DL semi-persistent reception if available (during a DL talk-spurt) and make an uplink semi-persistent transmission if available (during an UL talk-spurt). The mobile device will also detect all the DL grants and possibly make uplink additional resource requests.

In case of retransmissions (either the DL or the UL), the mobile device will enter the continuous mode by default. Note that both the uplink and downlink VoIP semi-persistent allocations have the same traffic characteristics (every 20 ms), hence the base station can easily align the semi-persistent allocation for the DL and UL.

With this approach, even in the active mode (talk-spurt in progress on the uplink or the downlink), the mobile device can be in DRX and DTX mode most of the time. The mobile device monitors the Layer 1 CCEs on the downlink only during the awake period, and may request more resources on the uplink. This can save battery power for the mobile device. Considering that an additional IP packet delivery during a VoIP session may be infrequent, the battery saving could be significant. A drawback is that the dynamic scheduling could be delayed by an additional 10 ms on average.

Figure 5:
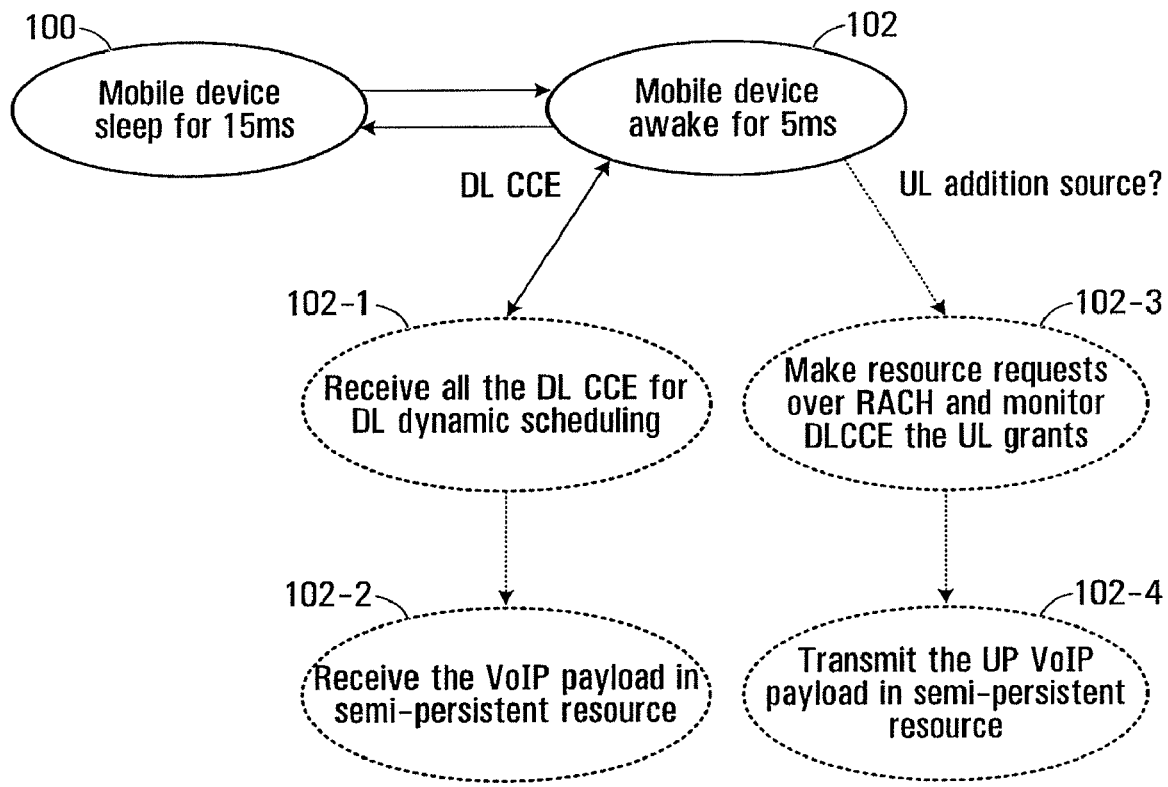
FIG. 5 is a state diagram having DRX and DTX transitions for VoIP.

Referring now to FIG. 5, shown is a state diagram having DRX/DTX state transitions for VoIP. It is noted that when there is no uplink and downlink transmission (i.e. silence in both directions), the mobile device only needs to monitor the DL CCEs for dynamic scheduling during the awake period. There are two main states. The first main state is the UE sleep state 100 and the second main state is the UE awake state 102. For the illustrated example, it is assumed that the sleep state 100 lasts 15 ms and the awake state lasts 5 ms and can be extended, but this is again implementation specific. Blocks 102-1 and 102-2 illustrate actions executed by the UE for downlink communication during the awake state 102. At block 102-1, the UE receives all of the downlink CCEs and processes them to identify downlink dynamic scheduling if present. This is done irrespective of whether or not there is any downlink VoIP transmission. In the event that a downlink talk-spurt is ongoing, then the UE, at block 102-2 receives the VoIP payload in the semi-persistent resource. Blocks 102-3 and 102-4 illustrate actions executed by the UE in respect of uplink transmissions. At block 102-3, the UE makes a resource request over a random access channel (RACH) and monitors the downlink CCE for uplink grants, if the mobile device determines that it needs a dynamic allocation for uplink transmission. In addition, if there is an uplink talk-spurt in progress, then the mobile device, at block 102-4, transmits the uplink VoIP payload in the semi-persistent resource for uplink transmission.

The above description has focussed on applications where the traffic that is sent using the semi-persistent allocation is VoIP traffic. More generally, the same methods and systems can be applied to combine the transmission and scheduling of traffic of any type on a semi-persistently allocated resource with the transmission and scheduling of traffic that uses dynamic resource allocations.

In the above examples, CCEs spaced by 1 ms are used for the downlink control channel. More generally, the downlink control channel can take any form. The only limitation is that dynamic allocations for a given mobile device take place during awake periods for the mobile device. Similarly, at least in the figures, the uplink control channel has been depicted as a random access channel that is available at intervals spaced by 1 ms. More generally, the uplink control channel for requesting additional resource allocations can come in any form. The only limitation is that requests for dynamic allocations for uplink transmission from a given mobile device will need to be transmitted during awake periods for the mobile device.

In some embodiments, the additional packet is transmitted as a series of one or more sub-packets formed by segmenting the additional packet. These are subject to reassembly at the receiver.

Figure 6:
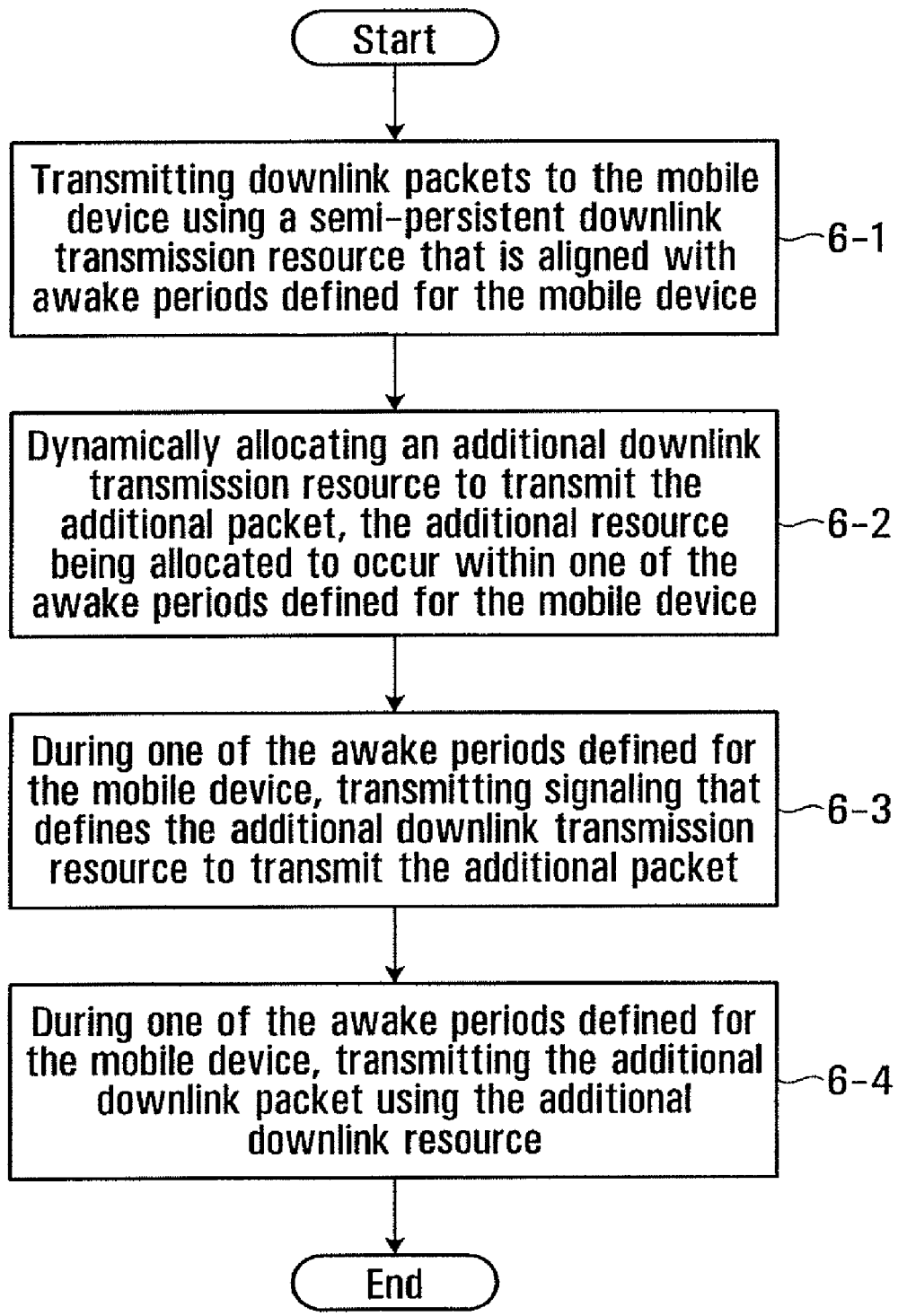
FIGS. 6 and 7 are flowcharts of methods executed by a network to perform combined semi-persistent and dynamic scheduling.

Methods for Semi-Persistent Scheduling and DRX Control Executed by the Wireless Network A method in a wireless network for performing downlink transmission to mobile devices will be described with reference to the flowchart of FIG. 6. This method is performed for each mobile device being provided wireless access on a semi-persistent downlink transmission resource. The method begins at block 6-1 with transmitting downlink packets to the mobile device using a semi-persistent downlink transmission resource that is aligned with awake periods defined for the mobile device. These can be downlink VoIP packets during a downlink talk-spurt for a VoIP session involving the mobile device or otherwise. Blocks 6-2, 6-3, 6-4 are executed for each additional downlink packet for the mobile device. In block 6-2, the wireless network dynamically allocates an additional downlink transmission resource to transmit the additional packet, the additional resource being allocated to occur within one of the awake periods defined for the mobile device. In block 6-3, during one of the awake periods defined for the mobile device, the wireless network transmits signaling that defines the additional downlink transmission resource to transmit the additional packet. In block 6-4, during one of the awake periods defined for the mobile device, the wireless network transmits the additional downlink packet using the additional downlink resource. In some embodiments, this method is performed in a base station. In other embodiments, certain portions of the method, for example the dynamic allocation, can be performed in another network element if centralized scheduling is performed.

Figure 7:
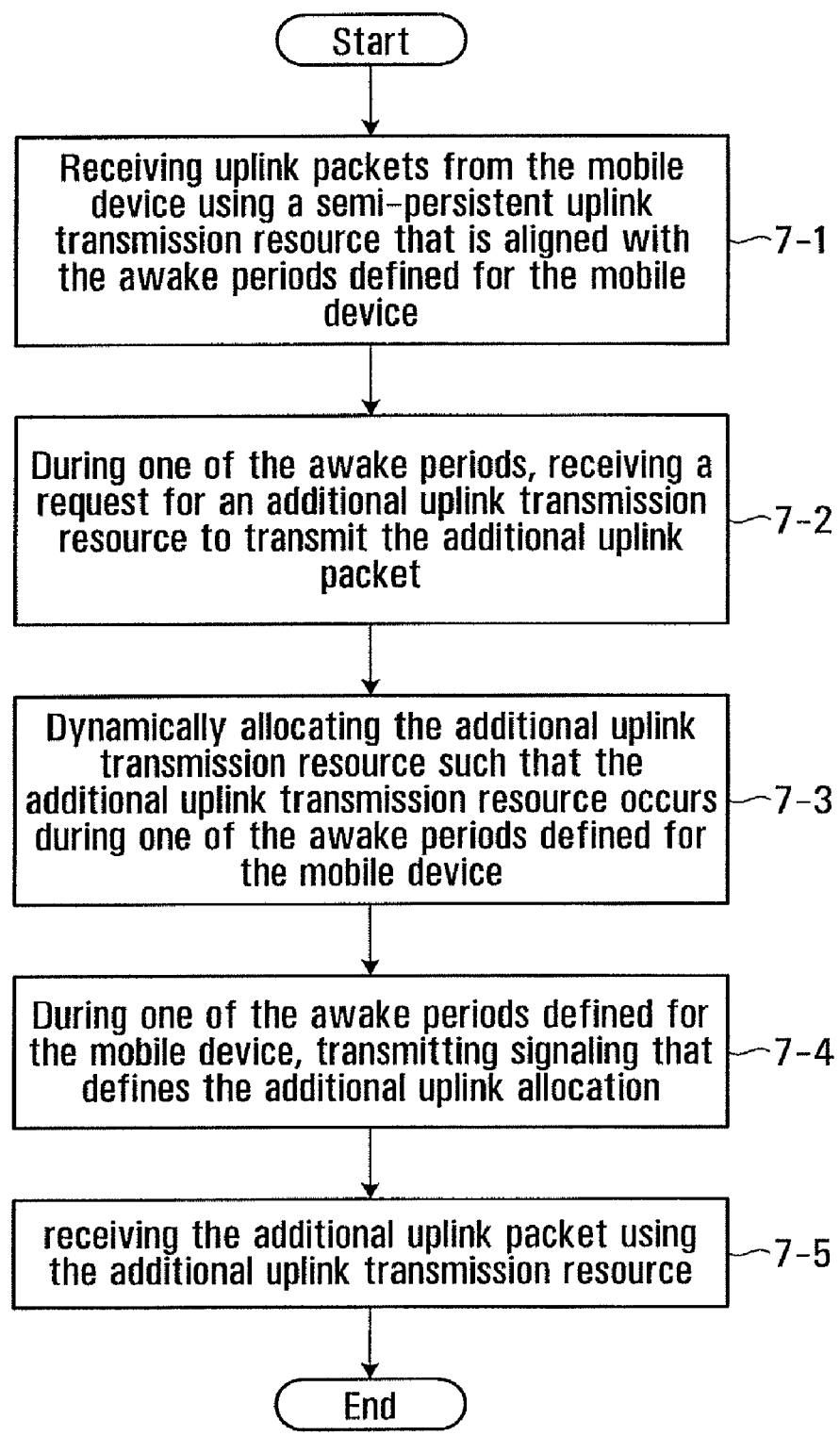

A method in a wireless network for performing uplink reception from mobile devices will be described with reference to the flowchart of FIG. 7. This method is performed for each mobile device being provided wireless access on a semi-persistent downlink transmission resource. The method begins at block 7-1 with the wireless network receiving uplink packets from the mobile device using a semi-persistent uplink transmission resource that is aligned with the awake periods defined for the mobile device. These can be VoIP packets during an uplink talk-spurt for a VoIP session involving the mobile device or otherwise. Blocks 7-2, 7-3, 7-4 and 7-5 are performed for each additional each additional uplink packet for the mobile device. In block 7-2, during one of the awake periods, the wireless network receives a request for an additional uplink transmission resource to transmit the additional uplink packet. In block 7-3, the wireless network dynamically allocates the additional uplink transmission resource such that the additional uplink transmission resource occurs during one of the awake periods defined for the mobile device. In block 7-4, during one of the awake periods defined for the mobile device, the wireless network transmits signaling that defines the additional uplink allocation. In block 7-5, the wireless network receives the additional uplink packet using the additional uplink transmission resource.

In some embodiments, the wireless network transmits signaling to each mobile device that defines the awake periods and that defines sleep periods of that mobile device and/or that defines the semi-persistent uplink and/or downlink transmission resource of that mobile device. For VoIP, the signaling to define the semi-persistent resources might be done at the start of each VoIP session. Such signaling can be performed on a channel that is dedicated to each mobile device, or using a broadcast channel containing such signaling for multiple devices.

Figure 8:
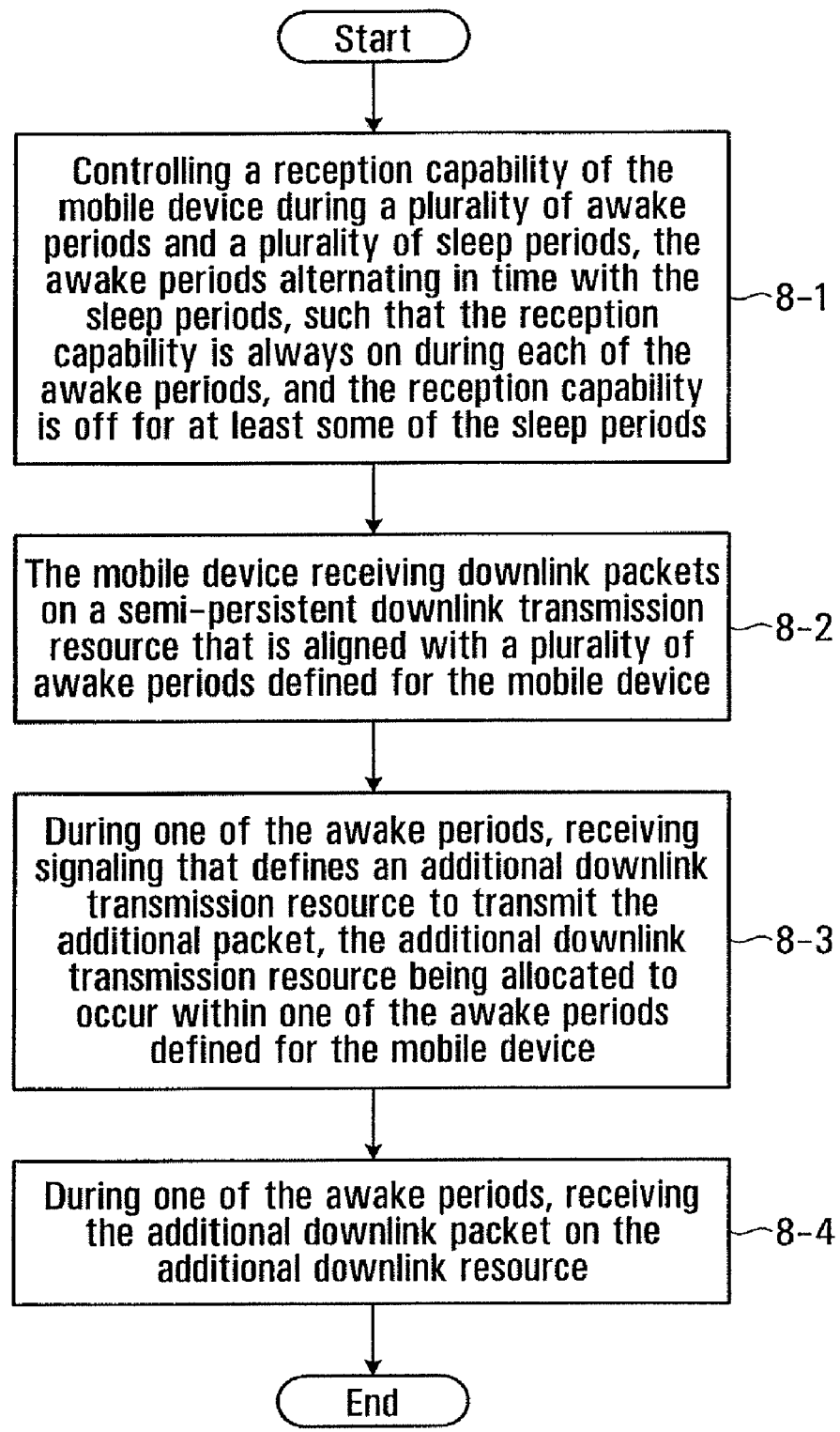
FIGS. 8 and 9 are flowcharts of methods executed by a mobile device to perform combined semi-persistent and dynamic scheduling.

Methods for Semi-Persistent Scheduling and DRX Control Executed by the Mobile Device Referring now to FIG. 8, a method of receiving downlink transmission executed by a mobile device will now be described. The method begins at block 8-1 with the mobile device controlling a reception capability of the mobile device during a plurality of awake periods and a plurality of sleep periods, the awake periods alternating in time with the sleep periods, such that the reception capability is always on during each of the awake periods, and the reception capability is off for at least some of the sleep periods. On a nominal basis, typically the reception capability will be off for every sleep period. At block 8-2, the mobile device receives downlink packets on a semi-persistent downlink transmission resource that is aligned with a plurality of awake periods defined for the mobile device. These can be VoIP downlink packets during a downlink talk-spurt for a VoIP session involving the mobile device, or otherwise. Blocks 8-3 and 8-4 are performed for each additional downlink packet for the mobile device. In block 8-3, during one of the awake periods, the mobile device receives signaling that defines an additional downlink transmission resource to transmit the additional packet, the additional downlink transmission resource being allocated to occur within one of the awake periods defined for the mobile device. In block 8-4, during one of the awake periods, the mobile device receives the additional downlink packet on the additional downlink resource.

The mobile device may receive signaling that defines the awake periods and the sleep periods of the mobile device and/or that defines the semi-persistent downlink transmission resource of that mobile device. This may take place over a respective dedicated channel for the mobile device or over a broadcast channel containing signaling information for the mobile device and other mobile devices.

Figure 9:
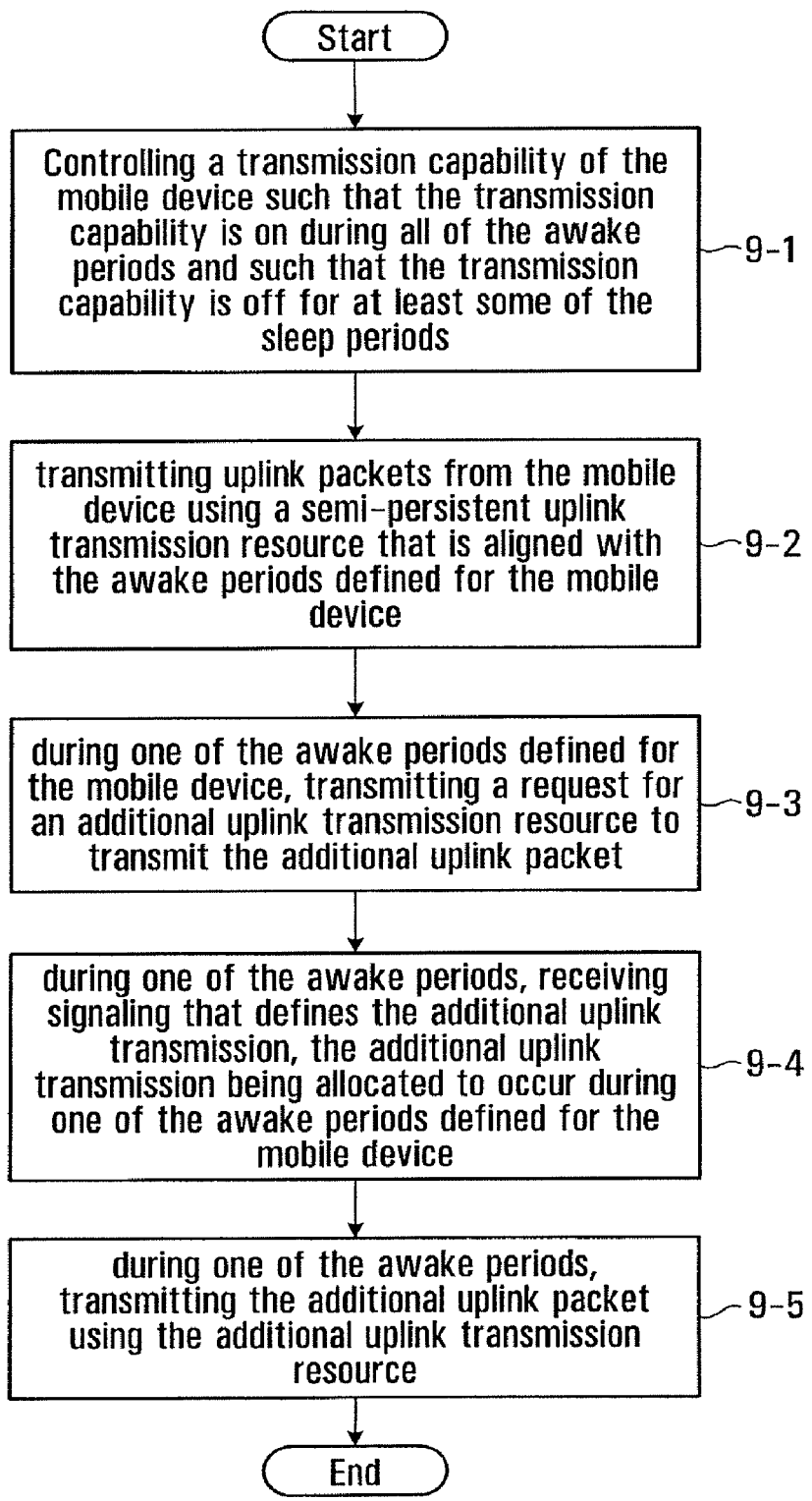

Referring now to FIG. 9, a method of transmitting uplink transmissions executed by a mobile device will now be described. The method begins at block 9-1 with controlling a transmission capability of the mobile device such that the transmission capability is on during all of the awake periods and such that the transmission capability is off for at least some of the sleep periods. In block 9-2, the mobile device transmits uplink packets (VoIP packets or otherwise) using a semi-persistent uplink transmission resource that is aligned with the awake periods defined for the mobile device. Blocks 9-3, 9-4, 9-5 are executed for each additional uplink packet for the mobile device. In block 9-3, during one of the awake periods defined for the mobile device, the mobile device transmits a request for an additional uplink transmission resource to transmit the additional uplink packet. In block 9-4, during one of the awake periods, the mobile device receives signaling that defines the additional uplink transmission resource, the additional uplink transmission resource being allocated to occur during one of the awake periods defined for the mobile device. In block 9-5, during one of the awake periods, the mobile device transmits the additional uplink packet using the additional uplink transmission resource.

The mobile device may receive signaling that defines the semi-persistent uplink resource. In some embodiments, the request for an additional uplink allocation is transmitted using a contention based random access channel.

In some embodiments, mobile devices have radios that feature a transmitter and a receiver. While the radio is on, the receiver capability is on, and the receiver will be actively attempting to process signals received on the mobile device's antenna(s). There is not necessarily content for the given mobile device all the time that the receiver is on, but the receiver is consuming power nonetheless for that time period. In addition, while the radio is on, the mobile device is able to transmit. However, so long as the mobile device does not have something to transmit, there is no active transmission taking place, and as such little or no transmit power consumption occurs until there is an active transmission.

In embodiments referring to NACK/ACK transmission, the particular NACK/ACK scheme employed is implementation specific. Some embodiments employ an ACK only scheme; other embodiments employ a NACK only scheme, while others use both ACKs and NACKs.

Extensions to Periods for Further Dynamic Allocations

In some embodiments, as described in the detailed examples above, the dynamic allocations are always scheduled to occur during one of the awake periods that are nominally defined with fixed duration. In another embodiment, an awake period can be extended to allow for the transmission/ reception of one or more dynamic allocations. For example, a CCE sent during an awake period can allocate a dynamic resource allocation, and the mobile device stays powered on to allow that. During the period that the mobile device is powered on as a result of the dynamic resource allocation the mobile device continues to monitor the CCEs, and an additional CCE signalling another dynamic allocation can be sent and so on.

Figure 11:
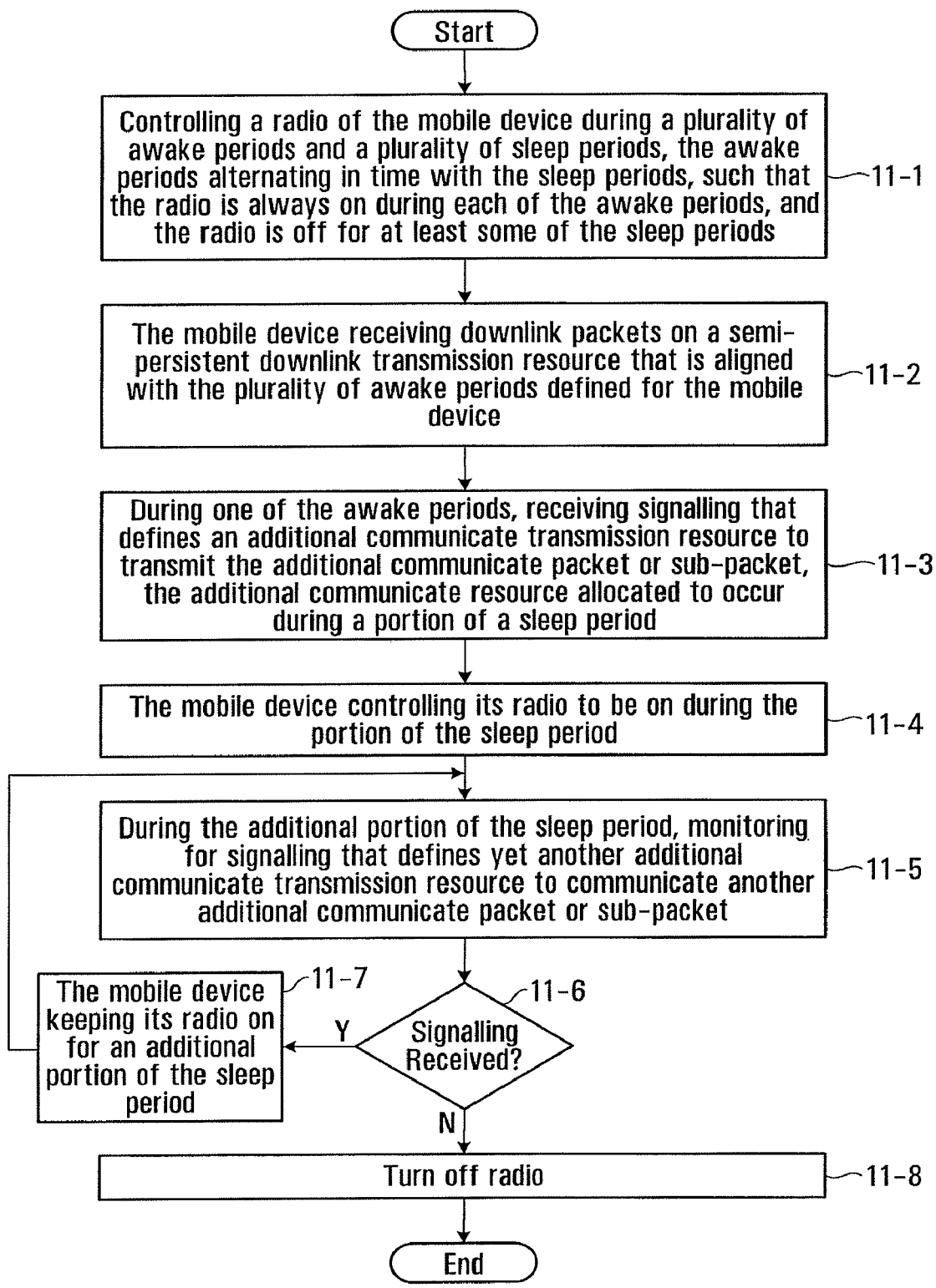
FIG. 11 is a flowchart of a method in a mobile device to keep its radio on to allow for dynamic allocations.

Referring now to FIG. 11, shown is a flowchart of a method for execution on a mobile device, such as the mobile device 10 of FIG. 2 for example.

The method starts at block 11-1 with the mobile device controlling its radio during a plurality of awake periods and a plurality of sleep periods, the awake periods alternating in time with the sleep periods, such that the radio is always on during each of the awake periods, and the radio is off for at least some of the sleep periods. Examples of how this might be achieved have been described above. The awake periods are also referred to as on periods, or periods of nominal on duration.

At block 11-2, the mobile device receives downlink packets on a semi-persistent downlink transmission resource that is aligned with the plurality of awake periods defined for the mobile device. In the event there is something to send during a given awake period, it is sent on the semi-persistent downlink transmission resource. If there is nothing to send, the semi-persistent resource is not used. Various examples have been provided above.

Blocks 11-3, 11-4 and 11-5 are performed for an additional downlink packet or sub-packet for the mobile device. To begin, at block 11-3, during one of the awake periods, the mobile device receives signaling that defines an additional transmission resource to communicate the additional packet or sub-packet. The receipt of such signalling is a trigger for the mobile device to control its radio to be on for an additional period at block 11-4. The additional period occurs during a portion of a sleep period. At block 11-5, during the portion of the sleep period that the mobile device is keeping its radio on, the mobile device monitors for signaling that defines yet another additional transmission resource to another additional packet or sub-packet. In the event such signaling is received, yes path at block 11-6, the mobile device keeps its radio on for an additional portion of the sleep period at block 11-7 and the method continues back at block 11-5. In the event no such signalling is received (no path, block 11-6) typically, the mobile device will turn its radio off at the end of the additional period. This is shown at block 11-8. It is possible the mobile device will keeps its radio on for some other reason.

The use of an inactivity timer is one mechanism for realizing the functionality described above with reference to FIG. 11. In some embodiments, upon receiving signalling that defines the additional transmission resource to transmit the additional packet or sub-packet, the mobile device starts a timer that counts down the additional period. The timer may be referred to as an inactivity timer because the mobile device will turn its radio off only if the timer times out without any activity (i.e. further dynamic allocation). If before the expiry of the timer signalling is received that defines yet another additional downlink transmission, the mobile device restarts the timer. The mobile device keeps is radio on as long as the timer has not expired. So long as the timer has not expired, additional dynamic allocations can be made that will restart the timer. The mobile device monitors for signaling defining further transmission resources to transmit further additional packets or sub-packets so long as the timer has not expired. In some embodiments, the timer starts when signaling that defines the additional transmission resource is received. In some embodiments, the timer starts when the packet transmitted on the resource thus allocated is communicated to/by the mobile device.

The methods described above may, for example, be implemented by the radio manager 14 in controlling the wireless access radio 12 of FIG. 2. The control functionality may be implemented in hardware, software, firmware, or any combination thereof. Another embodiment provides a computer readable medium having instructions stored thereon for execution by a mobile device that control the execution of one of the methods described above.

Figure 12:
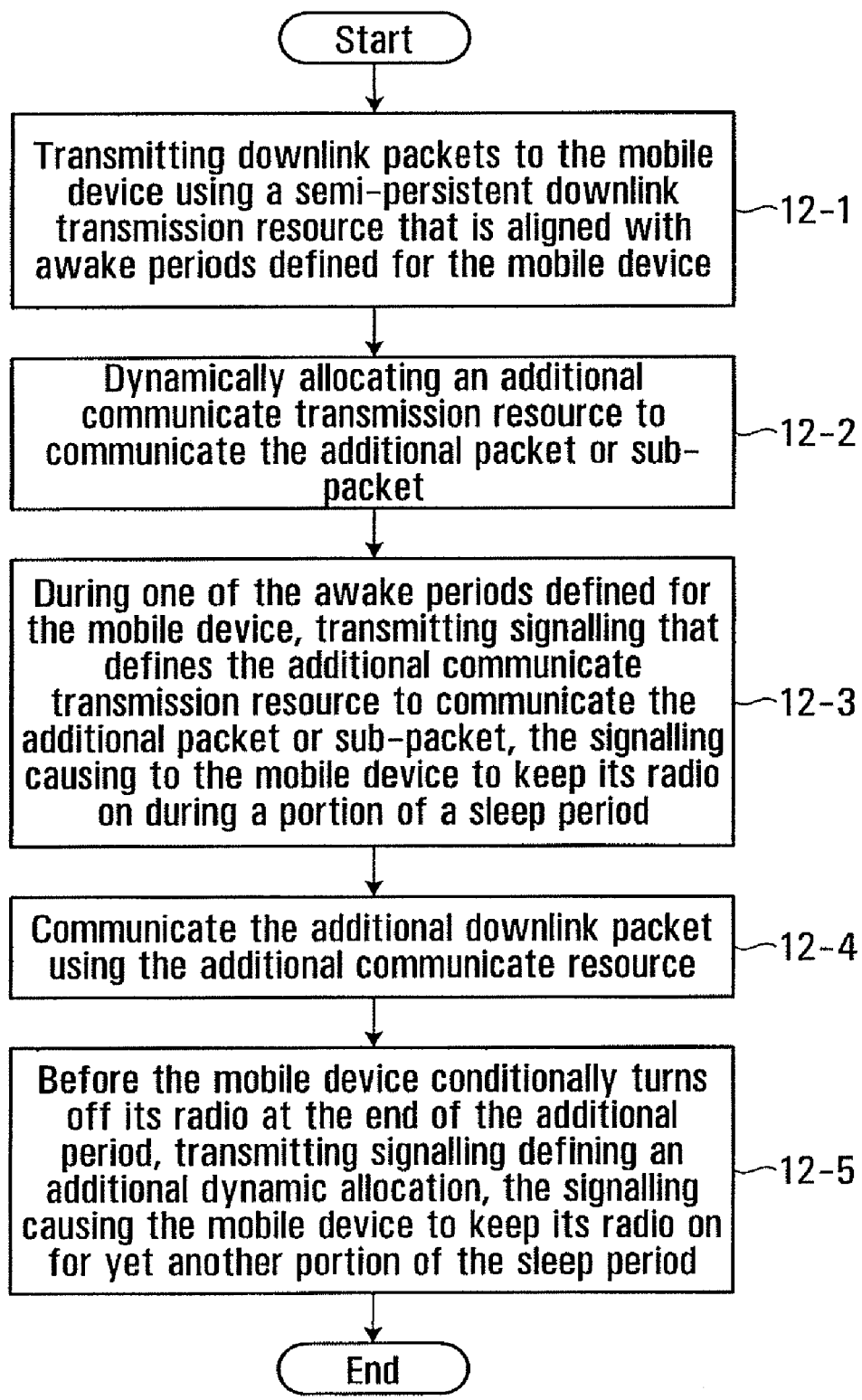
FIG. 12 is a flowchart of a method in a wireless network for sending dynamic allocations to a mobile device.

Referring now to FIG. 12, shown is a flowchart of a method for execution by a wireless network. This might, for example, be executed by the wireless network 28 of FIG. 2. Typically the method would be executed by a base station that is providing wireless access to a given mobile device, but other network components may be involved as well. Various steps are executed for each mobile device of a plurality of mobile devices. At block 12-1, the network transmits downlink packets to the mobile device using a semi-persistent downlink transmission resource that is aligned with awake periods defined for the mobile device. The mobile device will have its radio on during these periods and will be able to receive the transmission. In the event there is nothing for the mobile device during a given awake period, the semi-persistent resource is not used to transmit to the mobile device for that period. Blocks 12-2, 12-3 and 12-4 are executed for each additional packet or sub-packet for the mobile device. At block 12-2, the network dynamically allocates an additional transmission resource to communicate the additional packet or sub-packet. At block 12-3, during one of the awake periods defined for the mobile device, the network transmits signaling that defines the additional transmission resource to communicate the additional packet or sub-packet, the signaling indicating to the mobile device to keep its radio on for a portion of a sleep period. At block 12-4, the network communicates the additional downlink packet using the additional downlink resource. At block 12-5, the network optionally transmits signaling defining an additional dynamic allocation in the event there is yet another additional packet or sub-packet for the mobile device. Before the mobile device conditionally turns off its radio at the end of the additional period, the network transmits signalling defining an additional dynamic allocation, the signalling indicating the mobile device to keep its radio on for yet another portion of the sleep period.

The methods described above may, for example, be implemented by the scheduler 32 of the wireless network 28 of FIG. 2. The control functionality may be implemented in hardware, software, firmware, or any combination thereof. Another embodiment provides a computer readable medium having instructions stored thereon for execution by a wireless network that control the execution of one of the methods described above.

More generally, in some embodiments, the mobile device keeps its radio on for an additional period beyond the normal awake period for any number of reasons. Specific examples include transmission of an ACK/NACK, reception of a retransmission in the event the packet was received in error, and receiving a dynamically scheduled transmission. If during such an additional period the mobile device receives a dynamic allocation, the mobile device starts a timer upon receipt of a dynamically scheduled transmission during which the radio is kept on. In addition, the mobile device re-starts the timer upon receipt of a further dynamically scheduled transmission before expiry of the timer.

In some embodiments, the portion of the sleep period is an extension of an awake period. In other embodiments, the portion of the sleep period is separate and distinct from the awake periods.

In some embodiments, this behavior is implemented in respect of dynamic allocations for uplink transmission in which case the transmission resource is an uplink transmission resource, and the communication on the additional transmission resource involves transmission from the mobile device to the network. In other embodiments, this behavior is implemented in respect of dynamic allocations for downlink transmission I which case the transmission resource is a downlink transmission resource, and the communication on the additional transmission resource involves transmission from the network to the mobile device. In other embodiments, this behavior is implemented in respect of dynamic allocations for uplink or downlink transmission in which case the additional transmission resource may be either an uplink transmission resource or a downlink transmission resource, and the communication on the additional transmission resource may involve transmission from the mobile device to the network, or from the network to the mobile device. In the detailed examples that follow it is assumed that the dynamic allocations are for downlink transmission.

Another Mobile Device

Figure 10:
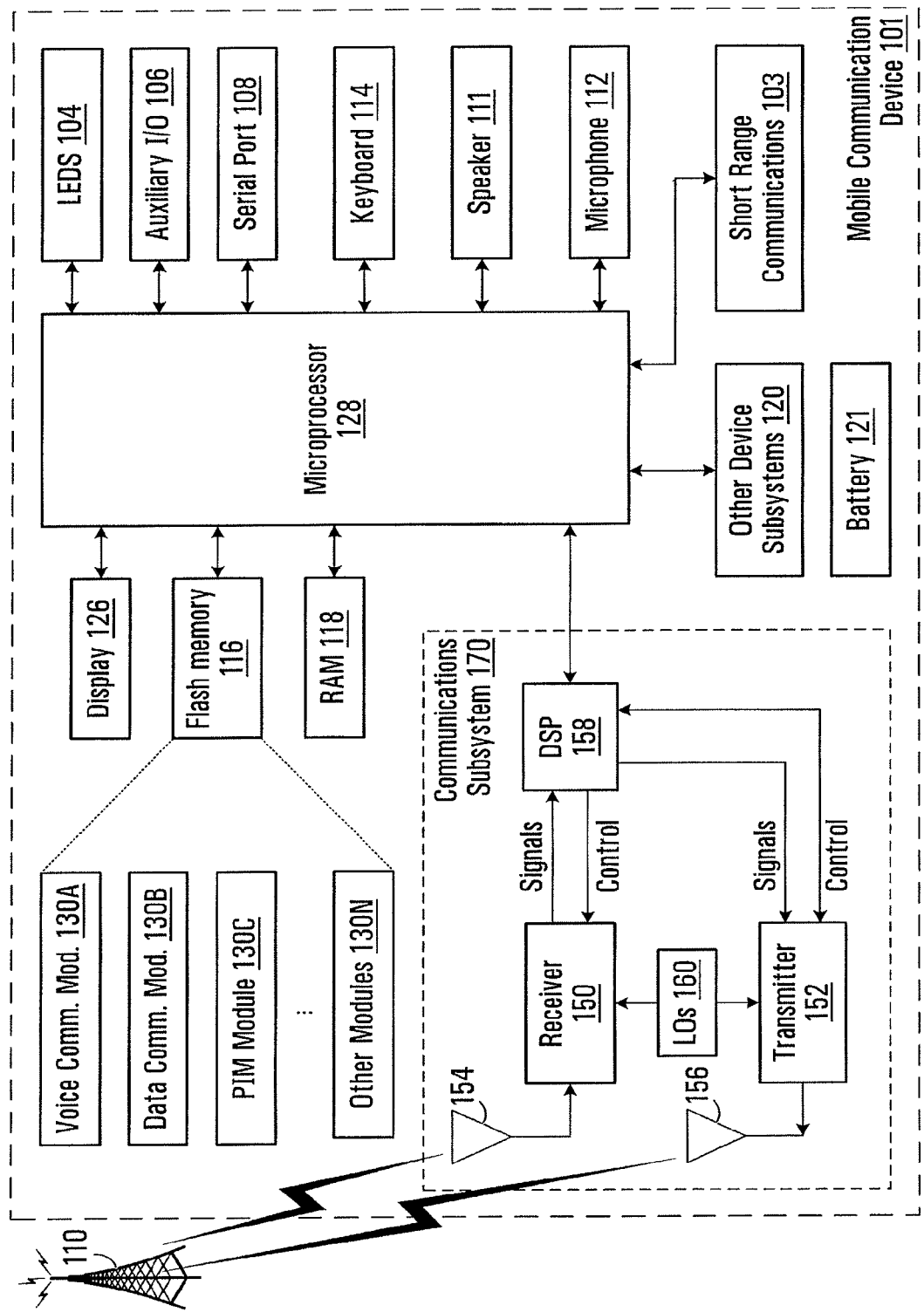
FIG. 10 is a block diagram of a mobile device.

Referring now to FIG. 10, shown is a block diagram of another mobile device that may implement any of the mobile device methods described herein. The mobile device 101 is shown with specific components for implementing features similar to those of the mobile device 10 of FIG. 2. It is to be understood that the mobile device 101 is shown with very specific details for example purposes only.

A processing device (a microprocessor 128) is shown schematically as coupled between a keyboard 114 and a display 126. The microprocessor 128 may be a specific example of the processor with features similar to those of the processor 16 of the mobile device 10 shown in FIG. 2. The microprocessor 128 controls operation of the display 126, as well as overall operation of the mobile device 101, in response to actuation of keys on the keyboard 114 by a user.

The mobile device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 101 are shown schematically. These include: a communications subsystem 170; a short-range communications subsystem 103; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 101 may have a battery 121 to power the active elements of the mobile device 101. The mobile device 101 is in some embodiments a two-way radio frequency (RF) communication device having voice and data communication capabilities. In addition, the mobile device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 101 may also be stored to the RAM 118.

The microprocessor 128, in addition to its operating system functions, enables execution of software applications on the mobile device 101. A predetermined set of software applications that control basic device operations, such as a voice communications module 130A and a data communications module 130B, may be installed on the mobile device 101 during manufacture. In addition, a personal information manager (PIM) application module 130C may also be installed on the mobile device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A, 130B, 130C, 130N of the flash memory 116 can be configured for implementing features similar to those of the radio manager 14 of the mobile device 10 shown in FIG. 2.

Communication functions, including data and voice communications, are performed through the communication subsystem 170, and possibly through the short-range communications subsystem 103. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a specific example of the wireless access radio 12 of the mobile device 10 shown in FIG. 2. The specific design and implementation of the communication subsystem 170 is dependent upon the communication network in which the mobile device 101 is intended to operate. For example, the communication subsystem 170 of the mobile device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the mobile device 101.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 101 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 101. In addition, the display 126 may also be utilized in voice communication mode, for example, to display the identity of a calling party, the duration of a voice call, or other voice call related information.

The short-range communications subsystem 103 enables communication between the mobile device 101 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the application may be practised otherwise than as specifically described herein.

The invention claimed is:

1. A method of transmitting data in a long term evolution (LTE) network, the method comprising:
 transmitting radio resource control (RRC) signaling to configure a wireless device for discontinuous reception (DRX) having a plurality of awake periods and a plurality of sleep periods such that a receiver of the wireless device is on during each of the awake periods, and the receiver of the wireless device is off for at least some portions of at least some of the sleep periods;

transmitting a first downlink signal over a physical downlink control channel (PDCCH) to the wireless device during one of the awake periods, the first downlink signal causing an inactivity timer to start if the inactivity timer is not running when the first downlink signal is received by the wireless device, and causing the inactivity timer to restart if the inactivity timer is already running when the first downlink signal is received by the wireless device;

transmitting a second downlink over the PDCCH to the wireless device during a sleep period, the sleep period corresponding to a time when the inactivity timer is running;

wherein the second downlink signal restarts the inactivity timer;

wherein the first downlink signal is an uplink grant and the second downlink signal is a downlink grant; and wherein the uplink grant corresponds to an uplink semi-persistent allocation and the downlink grant corresponds to a dynamic allocation.

2. A long term evolution (LTE) network configured to:

transmitting radio resource control (RRC) signaling to configure a wireless device for discontinuous reception (DRX) having a plurality of awake periods and a plurality of sleep periods such that a receiver of the wireless device is on during each of the awake periods, and the receiver of the wireless device is off for at least some portions of at least some of the sleep periods;

transmitting a first downlink signal over a physical downlink control channel (PDCCH) to the wireless device during one of the awake periods, the first downlink signal causing an inactivity timer to start if the inactivity timer is not running when the first downlink signal is received by the wireless device, and causing the inactivity timer to restart if the inactivity timer is already running when the first downlink signal is received by the wireless device;

transmitting a second downlink over the PDCCH to the wireless device during a sleep period, the sleep period corresponding to a time when the inactivity timer is running;

wherein the second downlink signal restarts the inactivity timer;

wherein the first downlink signal is an uplink grant and the second downlink signal is a downlink grant; and wherein the uplink grant corresponds to an uplink semi-persistent allocation and the downlink grant corresponds to a dynamic allocation.

3. The method of claim 1, wherein the uplink grant is transmitted using at least one control channel element.

4. The method of claim 1, wherein the downlink grant is transmitted using at least one control channel element.

* * * * *